UNITED STATES PATENT OFFICE

IRVING F. LAUCKS AND GLENN DAVIDSON, OF SEATTLE, WASHINGTON, ASSIGNORS TO I. F. LAUCKS, INCORPORATED, OF SEATTLE, WASHINGTON, A CORPORATION OF WASHINGTON

VEGETABLE PROTEIN GLUE AND PROCESS OF MAKING

No Drawing. Original application filed October 29, 1923, Serial No. 671,381. Divided and this application filed October 4, 1928. Serial No. 310,427.

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

Vegetable compounds have not, so far as we are aware, been heretofore satisfactorily employed as a basis for water-proof glues of the type in question. It is true that some veneer makers, on account of the high price of casein, have come to use starch glues but these, at least as heretofore made, are not at all water-proof, and vegetable proteins have not heretofore been used at all, so far as we are aware.

We have now discovered, however, that by subjecting the same to proper treatment, such vegetable proteins or vegetable matter containing proteins in proper amount, can be converted into a water-proof glue that will satisfy the rigid requirements of veneer making. The requisite raw material may be derived from a number of sources and the treatment of such is relatively simple and inexpensive so that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent. will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average 45 per cent. protein, 12 per cent. water, 5 per cent. cellulose or crude fiber, 7 per cent. oil, 6 per cent. ash, and 25 per cent. carbohydrates.

We do not, however, wish to limit ourselves to soya bean flour or to vegetable protein derived from this source for we have made satisfactory glue by our improved process from a low grade wheat containing approximately 10 per cent. protein and there are many other vegetable materials containing protein in amounts that may be utilized with proportionately good results.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical standpoint.

When the usual chemicals employed in making casein glue, viz., lime and sodium silicate, are added to a vegetable protein-containing material, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash and ammonia may be used, although more expensive. Similarly in place of lime, magnesia, baryta and strontia may be used as equivalents.

In order to improve the working properties, e. g. the spreading and flow, of the glue produced as aforesaid as well as the water resisting properties, we have found it desirable to add other substances of which the following are examples:—

Sodium dichromate. Equivalents would be other metallic dichromates or chromates.

Carbon bisulfide. Equivalents would be other sulfur compounds of like properties or constitution.

Copper sulfate, cuprammonium compounds, copper-caustic soda compounds. Equivalents would be other alkaline compounds of copper.

Quebracho, sumach, spruce extract (concentrated sulfite liquor). These are all commonly used tanning agents. Equivalents would be other vegetable tanning agents.

Cresylic acid. Equivalents would be other phenols.

Sodium silicate, or other soluble silicates.

Rosin, sodium or calcium soaps of rosin. Equivalents would be other resin or resin combinations with metals.

Carbon bisulfide imparts very great water resisting properties, copper salts and the dichromates make the glue more readily workable, while at the same time imparting increased water resistance. The tanning agents and cresylic acid increase the water resistance of the glue, the silicates and related compounds act as thinners while at the same time increasing the water resistance and strength of the glue; rosin and derivatives thereof act as thinners and make the glue more readily workable.

We have also found that certain substances, along with lime, will act in the same way as caustic soda and also as thinners, e. g. sodium phosphate, sodium perborate and sodium sulfite. These salts are all related in that they are combinations of a strong alkali metal base with a weak acid and there are a number of other salts that fall in the same category and which have a similar effect, so need not be listed in detail.

As examples we may cite the following typical formulæ:—

(1) Mix 30 parts soya bean flour with 120 parts water; add 13 parts of 18 per cent. caustic soda solution and mix; 5 parts carbon bisulfide are then added and stirred well; to this 3 parts calcium hydrate are added and stirred in; then 15 parts water glass (sodium silicate) are stirred in; finally, add 1 part copper sulfate to 5 parts of water and stir in. This makes the finished glue, which is then spread on panels, for example, put under pressure for several hours, whereupon the pressure may be released.

(2) Mix 30 parts soya bean flour, 5 parts rosin, 1½ parts copper sulfate, 1 part quebracho together dry; add 90 parts water and 26 parts 18 per cent. caustic soda solution: stir well; add 6 parts calcium hydrate in 15 parts water; then add 15 parts water glass, giving finished glue.

(3) Mix 30 parts soya bean flour, 5 parts rosin, 1½ parts copper sulfate, ½ part sodium dichromate, 90 parts water, 1 part cresylic acid, 26 parts 18 per cent. caustic soda solution, 6 parts calcium hydrate in 15 parts water, 15 parts water glass. The caustic soda in general may range from 2 to 5 parts, on the dry basis, to about 30 parts of soya bean flour.

The particular order in which the several ingredients are admixed together in the formulæ just given may be varied, and it is not necessary that the manufacture of the product be completed in a single continuous operation, but as a matter of practice we have found it desirable in certain cases to mix only certain of the ingredients initially and then add the others just before the glue is required for use. Thus, the soya bean flour, lime, rosin and potassium dichromate are mixed dry, and in this form shipped to the veneer plants. In the latter such dry product is then mixed with water, caustic soda solution and sodium silicate in the form of water glass, thereby making the finished glue.

It will also be understood, of course, that the foregoing formulæ are typical and that many variations are actually made therein in the compounding of our improved glue.

It will be noticed that in the foregoing, lime and alkali metal salts are used in conjunction. In the composition, these tend to react together, forming as the products of their reaction caustic soda and an insoluble lime salt. Additionally, as seen, we employ also caustic soda as such. If caustic soda be used as such for the entire requirements, there is a tendency for the product to have less water resistance than with development of caustic soda through reaction. On the other hand, if all of the caustic soda be developed by reaction, it would have to start from nothing and with such low alkalinity, there would be trouble due to foaming tendency and poor consistency which are not overcome later when the maximum possible alkalinity develops. If the reaction between lime and an alkali metal salt, that is double decomposition, is relied upon to produce the necessary alkalinity or caustic soda, then an interval of time must elapse before the necessary degree of alkalinity is developed. Before this interval can elapse, it being understood that the glue is subject to stirring, foam trouble appears due to the low alkalinity in the early part of the interval of time. Thus in the early stages of the glue preparation there must be a certain degree of alkalinity present to prevent foam and make good consistency. Also, where the lime and alkali metal salt are dry mixed with the seed flour, there is a great retardation in the rate of reaction between lime and alkali metal salt. This may be explained by reason of the fact that vegetable seed flours contain oil, and this oil has been found to migrate to any lime or alkali metal salt particles which are admixed dry with the flour and allowed to stand in contact. Accordingly, it will be noticed that our method provides some caustic soda at the start of the mixing, and then attains further the advantages of the reaction between the lime and the alkali metal salt, thus avoiding the various difficulties encountered when the caustic soda is provided by either procedure alone. Moreover, as seen, the amount of lime employed is in excess of that which a molecular reaction between lime and alkali metal salt would require, and by providing this excess, we further the water resistance of the glue.

This application is a division of our application Serial No. 671,381 filed Oct. 29, 1923. (Patent No. 1,689,732.)

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly point out and distinctly claim as our invention:—

1. A glue composition, comprising a proteinous vegetable seed flour treated with an alkali metal hydroxide, an alkaline earth hydroxide, and an alkali metal salt capable of reacting with alkaline earth hydroxide in the presence of water to form an insoluble salt of the alkaline earth.

2. A glue composition, comprising soya bean flour treated with an alkali metal hydroxide, an alkaline earth hydroxide and an alkali metal salt capable of reacting with alkaline earth hydroxide in the presence of water to form an insoluble salt of the alkaline earth.

3. A glue composition, comprising a proteinous vegetable seed floud treated with an alkali metal hydroxide, an alkali earth hydroxide, and an alkali metal salt capable of reacting with alkaline earth hydroxide in the presence of water to form an insoluble salt of the alkaline earth, the alkaline earth hydroxide being in excess of molecular reaction proportions with the alkali metal salt.

4. A glue composition, comprising soya bean flour treated with an alkali metal hydroxide, an alkaline earth hydroxide, and an alkali metal salt capable of reacting with the alkaline earth hydroxide in the presence of water to form an insoluble salt of the alkaline earth, the alkaline earth hydroxide being in excess of molecular reaction proportions with the alkali metal salt.

5. A glue composition, comprising the reaction products of soya bean flour and caustic soda as such, in the proportions of about 30 parts of soya bean flour and 2 to 5 parts of caustic soda as such, and the reaction products of lime and an alkali metal salt capable of forming an insoluble salt with the lime in the presence of water sufficient to produce glue of spreading consistency.

6. A glue composition, comprising the reaction products of soya bean flour and caustic soda as such, in the proportions of about 30 parts of soya bean flour and 2 to 5 parts of caustic soda as such, and the reaction products of lime and an alkali metal salt capable of forming an insoluble salt with the lime in the presence of water sufficient to produce glue of spreading consistency, said composition including also an excess of lime over molecular reaction proportions.

7. A glue composition, comprising the reaction products of soya bean flour and caustic soda, in the proportions of about 30 parts of soya bean flour and 2 to 5 parts of caustic soda as such, and the reaction products of 3 to 6 parts of lime and about 15 parts of water glass in the presence of water sufficient to produce glue of spreading consistency.

8. The process of making a glue, which comprises treating a proteinous vegetable seed flour with an alkali metal hydroxide, an alkaline earth hydroxide, and an alkali metal salt combinable with the alkaline earth hydroxide to form an insoluble compound with the alkaline earth, in the presence of water.

9. The process of making a glue, which comprises treating soya bean flour with an alkali metal hydroxide, an alkaline earth hydroxide, and an alkali metal salt combinable with the alkaline earth hydroxide to form an insoluble compound of the alkaline earth, in the presence of water.

10. The process of making a glue, which comprises treating a proteinous vegetable seed flour with an alkali metal hydroxide, an alkali metal salt combinable with an alkaline earth hydroxide to form an insoluble compound, and a proportion of alkaline earth hydroxide in excess of the molecular reaction proportions with such alkali metal salt, in the presence of water.

11. The process of making a glue, which comprises treating soya bean flour with an alkali metal hydroxide, an alkali metal salt combinable with an alkaline earth hydroxide to form an insoluble compound, and a proportion of alkaline earth hydroxide in excess of the molecular reaction with such alkali metal salt, in the presence of water.

12. The process of making a glue, which comprises treating soya bean flour with caustic soda, water glass and lime, in the presence of water, in the proportions of about 30 parts of soya bean flour, about 15 parts of water glass, and about 3 to 6 parts of lime.

IRVING F. LAUCKS.
GLENN DAVIDSON.